United States Patent [19]
Diaz et al.

[11] Patent Number: 5,423,055
[45] Date of Patent: Jun. 6, 1995

[54] TRUNKED COMMUNICATION SYSTEM WITH AUTOMATIC REPEATER TALK-AROUND

[75] Inventors: Rafael Diaz, Hoffman Estates; Masoud Bassiri, Streamwood, both of Ill.

[73] Assignee: Motorola, Inc., Schaumburg, Ill.

[21] Appl. No.: 84,675

[22] Filed: Jun. 29, 1993

[51] Int. Cl.⁶ .............. H04B 7/14; H04B 7/00; H04Q 7/28
[52] U.S. Cl. .................... 455/15; 455/17; 455/54.2
[58] Field of Search ............. 455/15, 16, 17, 33.1, 455/33.3, 34.1, 54.1, 54.2, 53.1, 56.1, 89, 90, 38.4; 379/59, 60, 61, 63; 340/988, 989, 990; 342/357

[56] References Cited

U.S. PATENT DOCUMENTS

| | | | |
|---|---|---|---|
| 4,553,263 | 11/1985 | Smith et al. | 455/17 |
| 4,636,791 | 1/1987 | Burke et al. | 455/38.4 |
| 5,043,736 | 8/1991 | Darnell et al. | 342/357 |
| 5,068,656 | 11/1991 | Sutherland | 340/989 |
| 5,247,567 | 9/1993 | Hirano | 379/61 |
| 5,313,653 | 5/1994 | Sasuta | 455/17 |

Primary Examiner—Reinhard J. Eisenzopf
Assistant Examiner—Lisa Charouel
Attorney, Agent, or Firm—Steven G. Parmelee

[57] ABSTRACT

A method to implement multiple talk-around communication links using the communication resources of one repeater. A system resource controller determines whether talk-around is possible for any two communication units intending to engage in a point-to-point communication link. Assignment of a talk-around repeater depends on the geographic locations of the two communication units, and a predetermined range criterion between them. In addition, the talk-around communication must not interfere with any existing talk-around communication already in the system. When talk-around communication is possible, an enabling communication grant is issued to the units, and the talk-around repeater's communication resources are assigned to support the link. Otherwise, a repeater for normal trunking is assigned.

13 Claims, 2 Drawing Sheets

TRUNKED COMMUNICATION SYSTEM WITH AUTOMATIC REPEATER TALK-AROUND

TECHNICAL FIELD

This invention relates generally to radio communications trunked systems.

BACKGROUND OF THE INVENTION

Trunked communications systems have developed extensively over the last two decades. The primary reason for trunking has always been to efficiently use the limited frequency spectrum allocated for such radio communications.

Generally, a trunking system operates on multiple usage of its repeaters by a group of communication units. A system resource controller manages the trunking system and allocates repeaters for communication links. At least one repeater, known as a repeater controller, serves to receive and transmit control commands between the system resource controller and the communication units. Typically, each communication link requires full use of a given repeater's communication resources, such as a pair of radio frequency channels or time division multiplexed time slots. Relative to the repeater, one such resource is inbound (for receiving transmissions), and the other is outbound (for transmitting information).

A procedure for establishing a communication link between two or more communication units typically begins with a request to communicate from a first communication unit. The request is a type of data codeword sent to the system resource controller, and is known in the art as a request Inbound Signaling Word (ISW). It is transmitted on the repeater controller's inbound communication resource. The request ISW identifies the first communication unit and a target group or fleet with whom the first communication unit wishes to communicate (private calls are also known in the art, wherein the request ISW specifically identifies a second communication unit as versus a plurality of target recipients).

The system resource controller then assigns a repeater to support the requested communication. Communication amongst these communication units begins after the system resource controller logs the request and issues a grant to the first communication unit (the grant being a data codeword transmitted as an Outbound Signaling Word (OSW) using the repeater controller's outbound communication resource). Throughout the communication, the system resource controller monitors the repeater assigned to support the communication. When the communication ends, the first communication unit transmits a disconnect word, known in the art as an End of Transmission (EOT), to the system resource controller.

Upon receiving the EOT, the system resource controller releases the repeater, thereby rendering it available to support other communication requests.

Repeater talk-around techniques are also known in the art. This form of communication eliminates communication through a repeater. Repeater talk-around allows use of a repeater's communication resource(s) to link two communication units directly. Such prior art talk-around techniques, however, are restricted to only one pair of communication units for each repeater. Therefore, although the repeater itself is not used, the repeater cannot be used for other communications because its communication resources are being used to support a talk-around communication within the system.

A significant limitation for prior art trunked radio systems is the available number of repeater communication resources. During periods when communication requests exceed the number of available repeater communication resources, users cannot link immediately, but must wait for a resource to become available. A need therefore exists for a way to use the communication resources of a trunked communication system to support an increased number of two-way communications, at least under some operating conditions.

DETAILED DESCRIPTION OF A PREFERRED EMBODIMENT

Trunked radio systems use repeaters to establish and maintain communication links between communication units. The present invention embodies a method of using a repeater's communication resources for multiple simultaneous point-to-point calls, such as private calls, between communication units. Based on the system's predetermined criteria, the system resource controller determines when to support such communication requests in a talk-around mode.

For a talk-around embodied in accordance with the present invention, the trunked radio system needs to identify candidate communication requests. One requirement is that these candidate requests do not require the longer range capability of a normal repeater. Additionally, the trunked radio system needs to ensure that talk-around by any pair of communicating units does not interfere with or affect similar talk-around calls already existing within the same trunked radio system.

Figure 1:
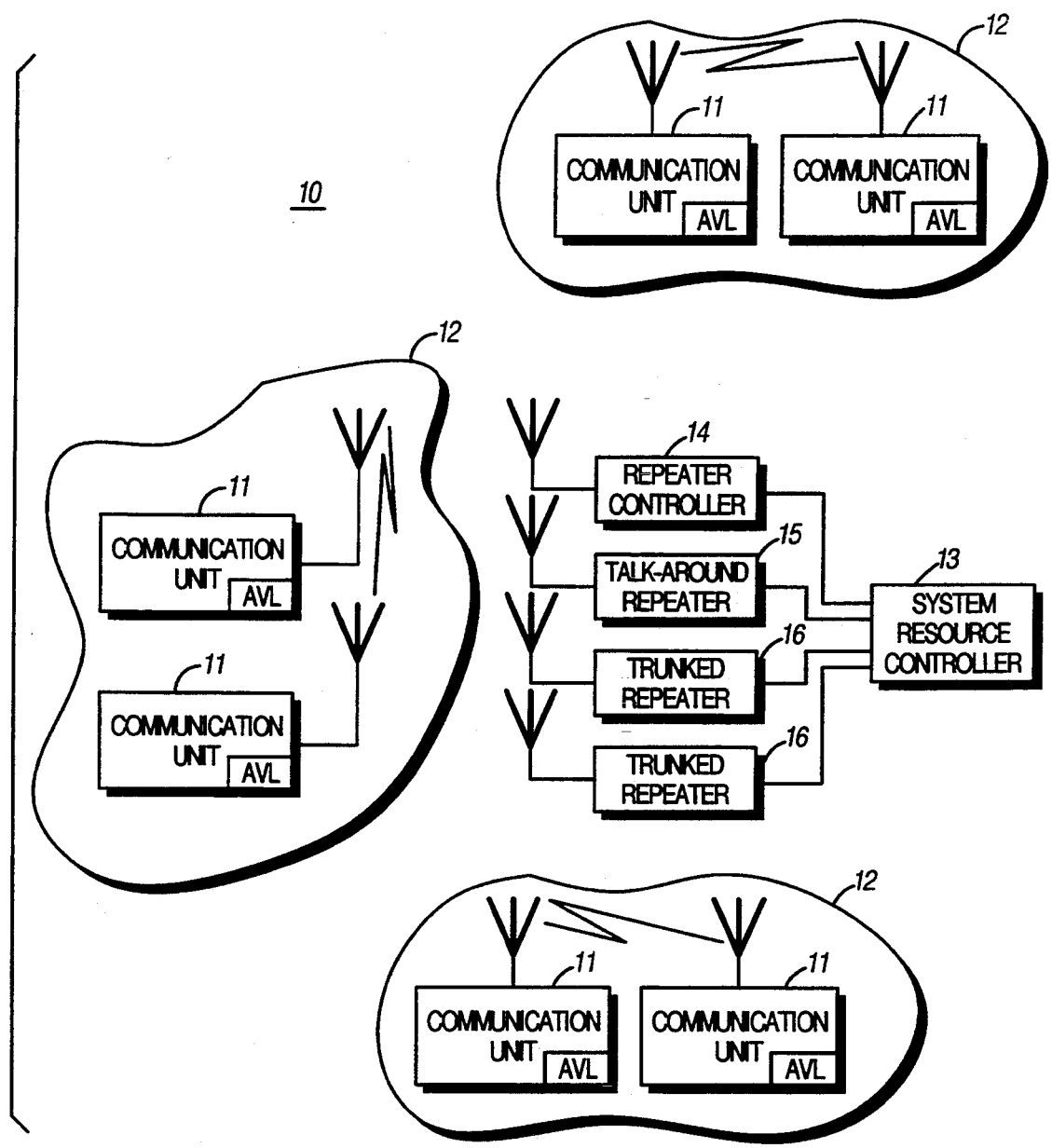
FIG. 1 is a block diagram illustrating a radio communications trunked system in accordance with the present invention.

FIG. 1 shows a trunked radio system (10) in accordance with the present invention. The trunked radio system (10) comprises a plurality of communication units (11), a system resource controller (13), a repeater controller (14), and a plurality of repeaters (15 and 16). At least one repeater (15) may operate in either a talk-around mode or a trunked mode, in accordance with the present invention. The communication units (11) are either fixed location, portables, or mobiles. Each communication unit (11) has a location-determining device known as an Automatic Vehicle Location (AVL) unit. The AVL unit enables the system resource controller (13) to keep track of the geographic location of each communication unit (11). Location determining devices based on LORAN-C and the U.S. government global positioning system are well known in the art.

FIG. 1 also shows three pairs (12) of communication units (11). For purposes of example, each pair (12) is illustrated as being engaged in a talk-around mode of communication as supported by the present embodiment. Each pair (12) of communication units (11) must meet a predetermined talk-around range in order to ensure viable communications without interfering with other communications. This predetermined range depends, at least in part, on the maximum range of the communication units (11). In addition, communications in each pair (12) must not interfere with or affect communications in any other pairs (12) (similar conditions will apply in situations where more than three pairs (12) of communication units (11) are operating simultaneously).

Figure 2:
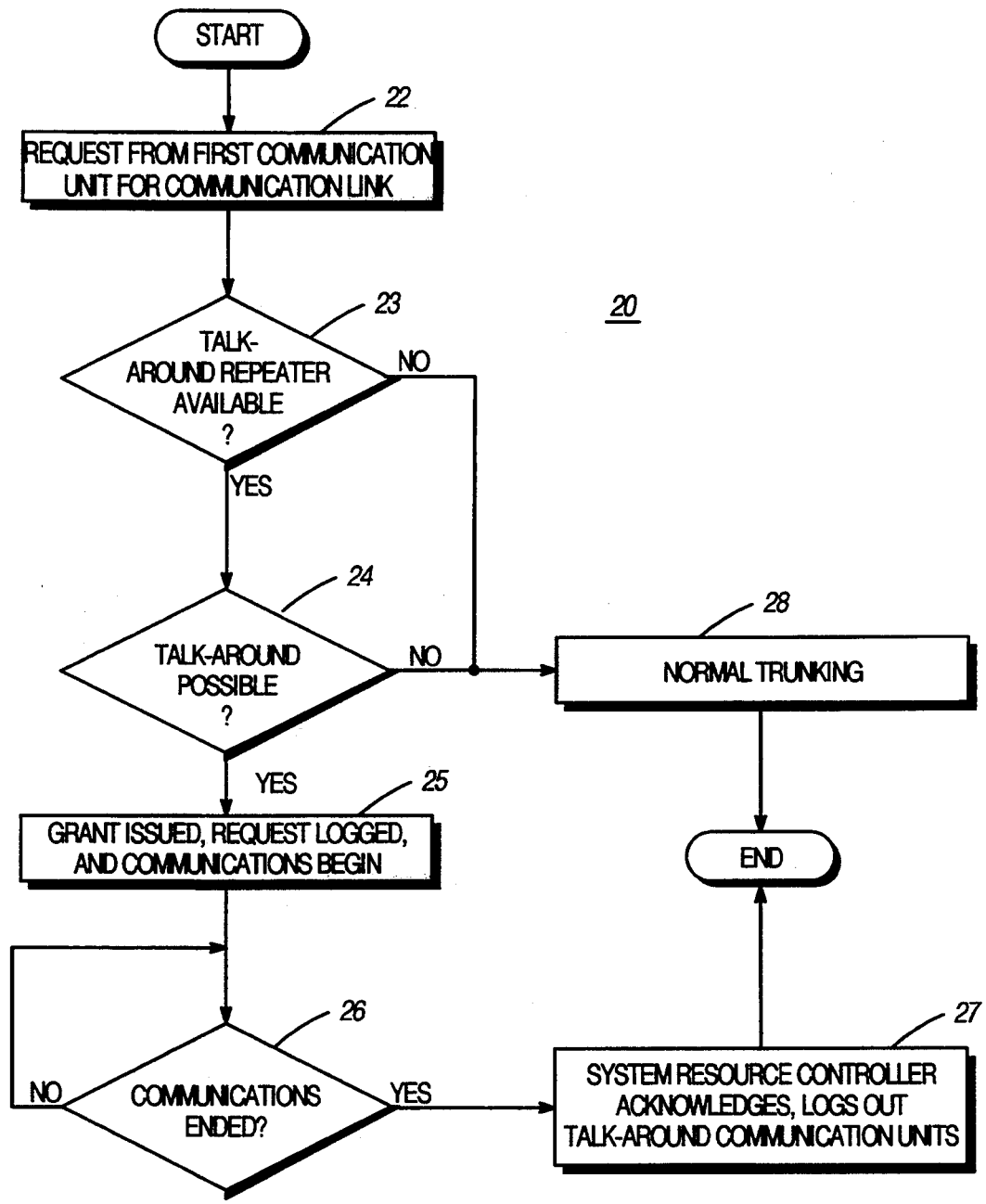
FIG. 2 is a flow diagram of a procedure for establishing a talk-around radio communications link in accordance with the present invention.

FIG. 2 illustrates a procedure (20) for establishing talk-around links in accordance with the present invention. A request (22) from a first communication unit (11) to establish a point-to-point private call with one other communication unit (11) goes to the system resource controller (13). The system resource controller (13) determines two things for this request (22). First, it checks the availability (23) of a talk-around repeater to support the request (22) (when not possible to facilitate the request (22) in a talk-around mode, it provides a repeater (16) for normal trunking (28)). Second, before authorizing a talk-around mode of communication, it determines whether talk-around is possible (24) based on the location of the first and target communication units (11). This second check determines whether the first and target communication units (11) are within range of each other, and moreover, verifies that their talk-around communication will not interfere with other pairs (12) of communication units (11). In other words, the system resource controller (13) has to confirm that the first and target communication units (11) are not within the range of other pairs (12) of communication units (11) operating with the same communication resources. When either of these checks fail, the system resource controller (13) will provide normal trunking (28). If talk-around is possible (24) the grant is issued, the request logged and communication begins (25).

As in normal trunking (28), the system resource controller (13) keeps track of these talk-around communications. Monitoring the location of all communication units (11) is a continuous process to ensure that they do not interfere with or affect each other. Communications in the talk-around mode ends (26) when the first communication unit (11) sends an EOT codeword to the system resource controller (13). Upon receiving the EOT, the system resource controller (13) logs off the affected units (27) from its database of ongoing communications, thus concluding the talk-around link procedure (20).

Figure 3:
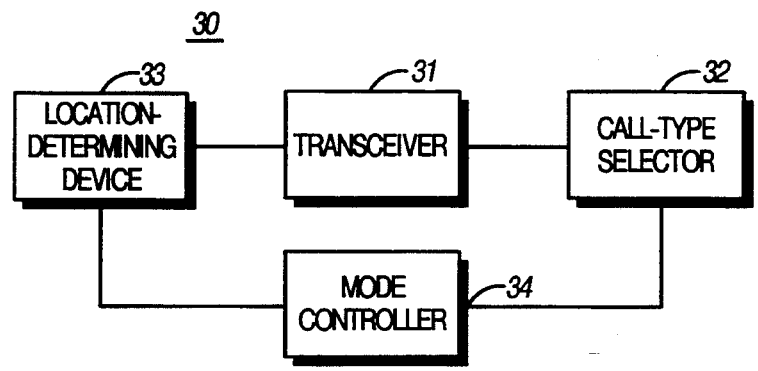
FIG. 3 is a block diagram illustrating a two-way radio in accordance with the present invention.

FIG. 3 shows a block diagram of an embodiment of a two-way radio (30) in accordance with the present invention. The two-way radio (30) comprises a transceiver (31), a call-type selector (32), a location-determining device (33), and a mode controller (34). The mode controller (34) couples operably to the transceiver (31), the calltype selector (32), and the location-determining device (33) such that either normal trunking or the talk-around is selectable, on the basis of instructions received by the two-way radio (30) from the system resource controller (13). When the mode controller (34) selects a mode of operation, it automatically signals to the call-type selector (32) to operate accordingly.

With the talk-around feature embodied in accordance with the present invention, changes to increase spectrum efficiency in existing trunked radio systems is easily implemented. As outlined above in the talk-around procedure (20), a repeater (15 or 16) can now possibly support more than one point-to-point communication. Further, since no new communication resources are added, additional communication resources are not required, and problems of obtaining new ones are avoided.

We claim:

1. A method comprising the steps of:
   A) receiving from a first communication unit a request to engage in a particular type of communication with an identified target;
   B) automatically determining whether to implement a repeater talk-around communication to support the particular type of communication requested;
   C) when determining to not implement the repeater talk-around communication, assigning a trunked communication resource to support the requested communication;
   D) when determining to implement, if possible, the repeater talk-around communication:
      D1) determining geographic locations of the first communication unit and the identified target;
      D2) when the geographic locations of both the first communication unit and the identified target are within a predetermined range of each other, instructing the first communication unit and the identified target to engage in the repeater talk-around communication.

2. The method of claim 1, wherein the step of instructing the first communication unit and the identified target to engage in the repeater talk-around communication includes the step of providing a carrier frequency to be used to support the talk-around communication.

3. The method of claim 2, wherein the carder frequency comprises a receive frequency for a trunked repeater.

4. The method of claim 3, wherein the receive frequency will not be assigned to support trunked communications while the carrier frequency has been assigned to support the talk-around communication.

5. The method of claim 1, wherein the particular type of communication with the identified target comprises a point-to-point communication.

6. The method of claim 1, and further including the step of:
   D3) when the geographic locations of both the first communication unit and the identified target are not within the predetermined range of each other, treating the request as a trunked communication request.

7. The method of claim 3, and further including the step of:
   E) upon receiving a communication indicating that the talk-around communication has concluded, determining whether to again trunk the carder frequency.

8. A method comprising the steps of:
   A) receiving from a first communication unit a request to engage in a particular type of communication with an identified target;
   B) automatically determining whether to implement a repeater talk-around communication to support the particular type of communication requested;
   C) when determining to not implement the repeater talk-around communication, assigning a trunked communication resource to support the requested communication;
   D) when determining to implement, if possible, the repeater talk-around communication:

D1) determining geographic locations of the first communication unit and the identified target;

D2) when the geographic locations of both the first communication unit and the identified target are within a predetermined range of each other, initiating the repeater talk-around communication such that:

D2a) when a carrier frequency is currently assigned to support another repeater talk-around communication, determining whether this present communication will interfere with such currently assigned repeater talk-around communication; and D2b) when the present communication will not so interfere, instructing the first communication unit and the identified target to engage in the repeater talk-around communication using the carrier frequency.

9. The method of claim 8, wherein the particular type of communication with the identified target comprises a point-to-point communication.

10. The method of claim 8, and further including the step of:

D3) when the geographic locations of both the first communication unit and the identified target am not within the predetermined range of each other, treating the request as a trunked communication request.

11. The method of claim 8, wherein the carder frequency comprises a receive frequency for a trunked repeater.

12. The method of claim 11, wherein the receive frequency will not be assigned to support trunked communications while the carrier frequency has been assigned to support the repeater talk-around communication.

13. The method of claim 11, and further including the step of:

E) upon receiving a communication indicating that the talk-around communication has concluded, determining whether to again trunk the carder frequency.

* * * * *

UNITED STATES PATENT AND TRADEMARK OFFICE
CERTIFICATE OF CORRECTION

PATENT NO.  : 5,423,055
DATED       : June 6, 1995
INVENTOR(S) : Rafael Diaz et al.

It is certified that error appears in the above-indentified patent and that said Letters Patent is hereby corrected as shown below:

Column 4, line 33, "carder" should be --carrier--.
Column 6, line 8, "carder" should be --carrier--.
Column 6, line 20, "carder" should be --carrier--.

Signed and Sealed this

Twelfth Day of September, 1995

Attest:

BRUCE LEHMAN

Attesting Officer

Commissioner of Patents and Trademarks